Patented Feb. 25, 1930

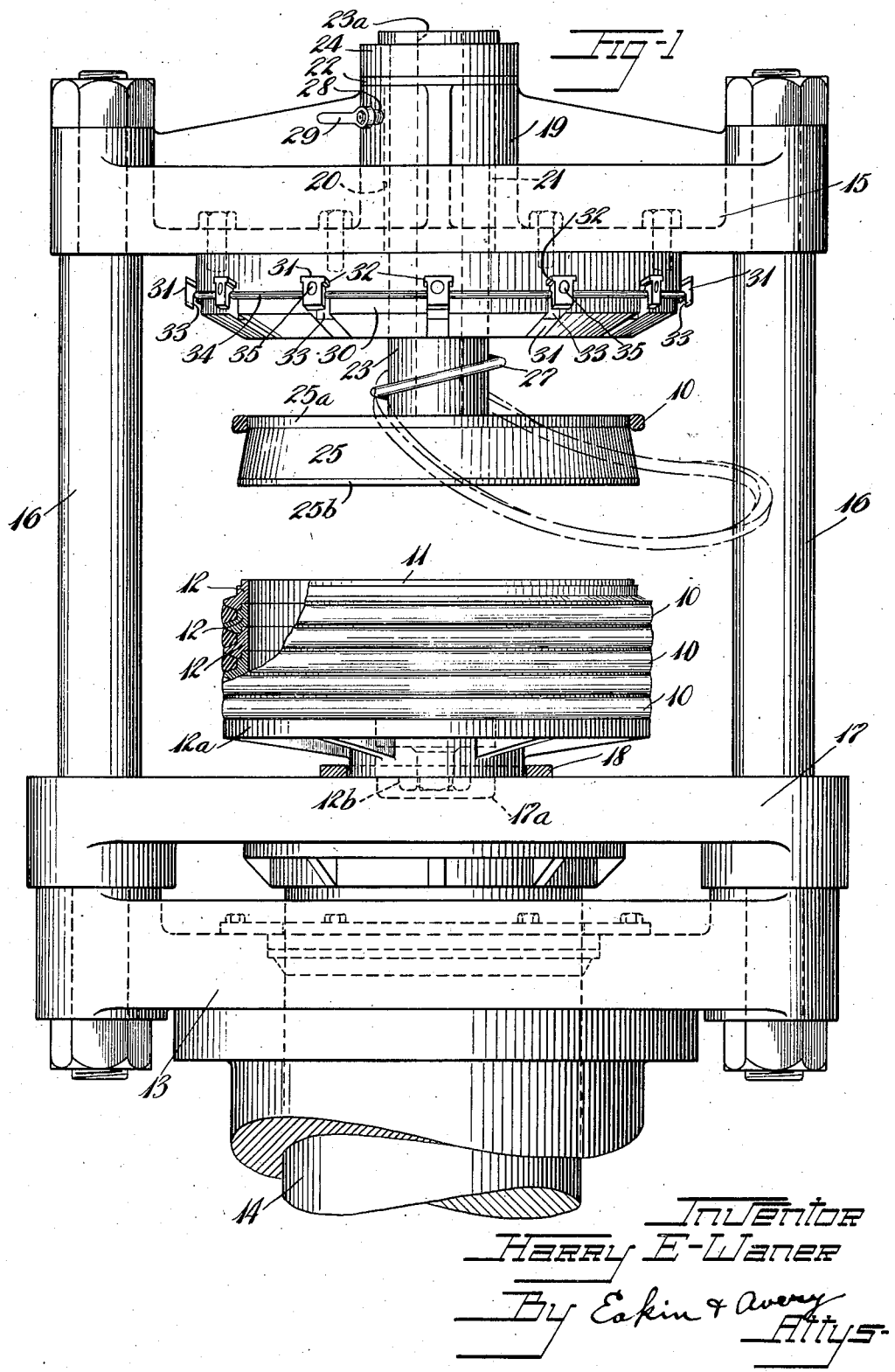

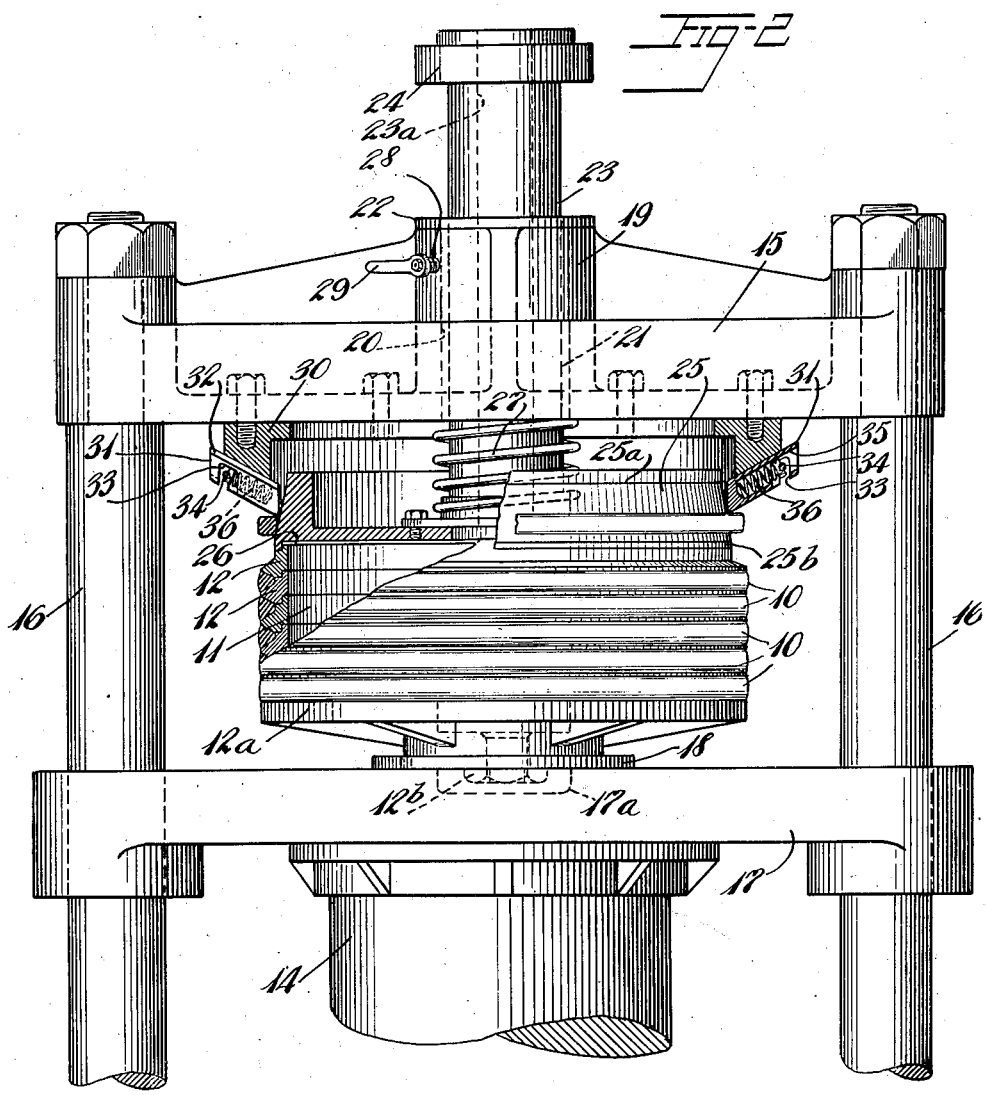

1,748,626

UNITED STATES PATENT OFFICE

HARRY E. WANER, OF AKRON, OHIO, ASSIGNOR TO THE B. F. GOODRICH COMPANY, OF NEW YORK, N. Y., A CORPORATION OF NEW YORK

APPARATUS FOR MOUNTING RINGS IN MOLDS

Application filed March 20, 1929. Serial No. 348,454.

This invention relates to apparatus for mounting rings in molds, and more especially to apparatus which stretches the rings as it mounts them in the mold cavities.

The apparatus is especially useful in the manufacture of power-transmission belts or fan belts of rubberized fibrous material, such belts preferably being vulcanized under circumferential tension to avoid excessive elongation of the belts while in use.

My chief objects are to provide improved apparatus for mounting an endless ring in a mold; to provide for concurrently stretching the ring as it is being mounted in the mold; to provide uniformity of stretch in the ring; and to save labor in the manufacture of the rings.

Of the accompanying drawings:

Fig. 1 is a side elevation of apparatus embodying my invention in its preferred form, and the work therein, the ring-mounting device being in its inoperative position.

Fig. 2 is view similar to Fig. 1 illustrating the operation of the apparatus.

Referring to the drawings 10, 10 are endless rings of rubberized fabric and rubber in unvulcanized state, and 11 is a sectional mold of known construction comprising a plurality of annular sections 12, 12 adapted to be assembled in coaxial relation, and so formed on their outer peripheries as to define a plurality of annular work-receiving grooves in the outer surface of the assembled structure. End sections such as the section 12ª complete the mold assembly, and one of the sections 12ª has a clamping nut 12ᵇ secured to its outer face in alignment with an axial aperture through its structure. The mold sections 12, 12ª, and the rings 10 are assembled in alternation, and the latter are made initially of smaller diameter than the mold grooves, and are circumferentially stretched before being mounted therein. By the use of the apparatus comprising the subject matter of this invention, the stretching of the rings and mounting them in the mold grooves comprises a single continuous operation.

The apparatus comprises a hydraulic press of which 13 is the base frame and 14 the ram thereof, and 15 is a stationary upper head mounted upon the upper ends of a pair of posts 16, 16 rising from the base frame 13. A cross-head 17 is mounted upon the upper end of the ram 14 and slidably engages the posts 16, and a positioning ring 18 is mounted upon the upper face of the cross-head 17 concentric with the axis of the ram 14 for positioning the mold section 12ª of the mold 11, and the cross-head is formed with a recess 17ª to accommodate the nut 12ᵇ on said mold section.

The stationary cross-head 15 is formed on its upper side with a boss 19 having therein a bore 20 coaxial with the positioning ring 18, and a bushing 21 is mounted in said bore and is formed with a circumferential flange 22 which overlies the top face of the boss 19. Slidably mounted in the bushing 21 is a vertical shaft 23 formed with an axial bore 23ª and having a retaining collar 24 mounted upon its upper end. Secured to the lower end of the shaft 23 and concentric therewith is an axially apertured, generally frusto-conical guide-member 25 which has cylindrical faces 25ª, 25ᵇ respectively at its upper and lower margins, at each side of its tapered face. The lower face of the guide 25 is concentrically recessed at 26 so that it may telescope with a marginal flange formed on the uppermost mold section 12 of the mold 11, and the cylindrical face 25ᵇ of the guide 25 is flush with the inner periphery of the work-receiving groove in said mold section when the guide is so telescoped therewith, as is clearly shown in Fig. 2. The diameter of the cylindrical face 25ª of the guide 25 is substantially the same as the diameter of an unstretched ring 10. A compression spring 27 is mounted upon the shaft 23 between the bottom face of the stationary head 15 and the upper face of the guide 25 and normally urges the latter and its shaft 23 downward. A set-screw 28 threaded through the boss 19 and bushing 21 and provided with a handle 29 is adapted to be tightened upon the shaft 23 to hold the same in elevated position when desired.

Secured to the lower face of the stationary cross-head 15 and extending downwardly therefrom is an annular tool-holder 30 disposed concentric with the tapered guide 25 and having an inside diameter greater than the outside diameter of the latter to permit the members to telescope when the guide is raised to its elevated position. The tool-holder 30 has slidably mounted thereon a circumferential series of yielding, radially disposed fingers 31, 31 which extend inwardly beyond the inner periphery of the holder 30 and are adapted to engage the tapered surface of the guide 25 when the latter is lifted past the lower edge of the holder. The fingers 31 are inclined downwardly toward their inner ends so that they are disposed substantially normal to the tapered face of the guide when they engage the same.

The fingers 31 are substantially rectangular in cross-section and are formed with lateral longitudinal flanges or shoulders 32, 32 at each of their upper edges. They are slidingly mounted in complementally shaped grooves or slots extending into the holder 30 from the bottom face thereof. Each of the fingers 31 has a relatively wide and deep notch 33 formed in its lower face adjacent the outer end thereof, and an endless ring 34 mounted circumferentially of the outer face of the holder 30 extends through the notches of the respective fingers. Each finger 31 has a central bore 35 extending into its structure, from the outer end thereof, a substantial distance past the notch 33, and a compression spring 36 is mounted in said bore and bears against the closed end thereof and against the ring 34. The arrangement is such that the fingers 31 are normally forced radially inward and the radial movement of the fingers in either direction is limited by the width of the notch 33 which notch spans the ring 34.

In the operation of the apparatus, the guide 25 and cross-head 17 being in lowered positions, the lower end-section 12ª of the mold 11 is mounted upon the cross-head within the positioning ring 18 thereon, and a belt or ring 10 is distorted and passed over the large end of the guide 25 and positioned upon the smaller cylindrical face 25ª thereof. The ram 14 is then caused to rise to carry the mold section 12ª toward the guide 25, and upon engaging the latter, the mold section telescopes with the marginal portions of the guide 25 by reason of the recess 26 in the lower face of the latter.

Continued rise of the ram carries the guide 25 and the work thereon upwardly against the pressure of the spring 27, and as the guide approaches the tool-holder 30 the inner ends of the respective tools or fingers 31 thereon engage the ring 10 and hold it stationary while the guide continues to rise and slide through the ring. The result of the relative movement between the guide 25 and ring 10 is to stretch the latter in a radial direction, the slidable arrangement of the fingers 31 permitting them to retract, against the yielding pressure of their springs 36, as they are engaged by the conical face of the guide 25. Further rise of the ram 14 carries its cylindrical portion 25ᵇ past the ring 10 and then the cavity portion of the mold member moves into the ring.

The operator then reverses the movement of the ram, and its downward movement carries the mold member 12ª with the work thereon and the guide 25 out of engagement with the fingers 31. Upon continued downward movement of the ram 14 the collar 24 of the guide shaft 23 comes to rest upon the bushing-flange 28 on the boss 19, thus causing the guide 25 to remain suspended while the mold member 12ª separates therefrom and continues to move downward. When the mold member and guide are separated a suitable distance the movement of the ram is halted and the operation as described is repeated with the successive mold members 12 to mount respective rings upon them. After sufficient mold sections and rings 10 are assembled, an end section 12ª is mounted upon the top of the assembly and the entire structure is bound together by a tie rod which is passed through the axial bore 23ª of the shaft 23 and through the mold assembly and threaded into the nut 12ᵇ on the lower end section 12ª. The mold assembly may then be removed from the device and prepared for the vulcanizer as by wrapping fabric upon the assembly to press the rings in the grooves.

The apparatus is economically operated by one operator and uniformly stretches successive rings and stretches each ring uniformly throughout its circumference and mounts each ring in a single continuous operation. The invention is especially useful for mounting square-section rings in a mold and it does not roll such rings on their cross-sectional axes as it moves them over the guide, as the fingers, being slidably mounted, maintain substantially the same angular relation to the ring throughout the operation. If desired, the rings may be lubricated to reduce friction with the guide.

The invention is susceptible of modification and I do not limit my claims wholly to the exact construction shown and described.

I claim:

1. In apparatus for mounting rings in molds, the combination of a mold having an annular molding surface, a tapered guide axially aligned with said surface, spreadable members adapted to engage a ring mounted on said guide, and means for relatively moving said members over the tapered surface of the guide to force the ring therefrom onto the said molding surface of the mold.

2. Apparatus as defined in claim 1 including yielding means urging the spreadable members relatively toward the smaller end of the guide, said yielding means being adapted to be overcome by the force of the mold against the larger end of the guide.

3. In apparatus for mounting rings in molds, the combination of a movable mold support for a mold formed with an annular molding surface, a tapered guide aligned with said molding surface and adapted to support a ring to be mounted therein, and ring-engaging means for holding the ring stationary while the guide and mold are moved relatively thereto to force the ring over the guide and onto the mold.

4. Apparatus as defined in claim 3 including yielding means urging the guide with its larger end foremost past the ring-engaging means and stop means for limiting its movement in that direction.

5. In apparatus for mounting rings in molds, the combination of a mold formed with an annular molding surface, a tapered guide aligned with said molding surface and adapted to support a ring, means adapted to engage the ring and slide it axially of the guide onto the annular molding surface, and means for effecting relative movement between the ring-engaging means and the guide.

6. Apparatus as defined in claim 5 in which the ring-engaging means comprises a set of members circumferentially spaced about the guide and slidably mounted for radial movement.

7. In apparatus for mounting rings in molds, the combination of a mold formed with an annular molding surface, a tapered guide spaced from said mold and coaxial with the molding surface thereof and adapted to support a ring to be mounted on said surface, work manipulating means spaced about and at a distance axially from said guide, and means for moving the mold into engagement with the guide and the latter into engagement with the work-manipulating means.

8. In apparatus for mounting rings in molds, the combination of movable mold-support, a mold having an annular molding surface, a movable tapered guide spaced from said support and adapted to support a ring to be mounted on said surface, a stationary tool support spaced from said guide, and a plurality of radially movable work-engaging members mounted upon said tool support.

9. In apparatus for mounting rings in molds, the combination of a tapered guide adapted to support a ring, and a plurality of radially slidable work-engaging members spaced about the guide and having work-engaging faces approximately perpendicular to the tapered surface of the guide.

10. In apparatus for mounting rings in molds, the combination of a mold formed with an annular molding surface, a tapered guide adapted to be mounted upon the mold, coaxial with said surface, and to support a ring to be mounted thereon, and means adapted to traverse the tapered face of the guide in an axial direction while retracting in a radial direction for sliding the ring over the guide and onto the molding surface.

11. Apparatus as defined in claim 10 in which the ring-sliding means comprises a plurality of fingers having their work-engaging faces disposed substantially normal to the tapered face of the guide.

In witness whereof I have hereunto set my hand this 16th day of March, 1929.

HARRY E. WANER.